(12) United States Patent
Grah et al.

(10) Patent No.: US 10,337,187 B1
(45) Date of Patent: Jul. 2, 2019

(54) SHINGLE PRODUCT

(71) Applicant: Mitsubishi Polyester Film, Inc., Greer, SC (US)

(72) Inventors: Michael Daniel Grah, Greenville, SC (US); Rodney Craig Carter, Hendersonville, NC (US)

(73) Assignee: Mitsubishi Polyester Film, Inc., Greer, SC (US)

( * ) Notice: Subject to any disclaimer, the term of this patent is extended or adjusted under 35 U.S.C. 154(b) by 0 days.

(21) Appl. No.: 15/632,018

(22) Filed: Jun. 23, 2017

Related U.S. Application Data

(60) Provisional application No. 62/354,395, filed on Jun. 24, 2016.

(51) Int. Cl.
| | | |
|---|---|---|
| *E04D 1/22* | (2006.01) | |
| *E04D 1/26* | (2006.01) | |
| *B32B 7/06* | (2019.01) | |
| *C09J 7/02* | (2006.01) | |
| *B32B 7/12* | (2006.01) | |
| *B32B 27/26* | (2006.01) | |
| *B32B 27/08* | (2006.01) | |
| *C09J 123/26* | (2006.01) | |
| *E04D 1/00* | (2006.01) | |

(52) U.S. Cl.
CPC ............. *E04D 1/22* (2013.01); *B32B 7/06* (2013.01); *B32B 7/12* (2013.01); *B32B 27/08* (2013.01); *B32B 27/26* (2013.01); *C09J 7/0228* (2013.01); *E04D 1/26* (2013.01); *B32B 2419/06* (2013.01); *C09J 123/26* (2013.01); *C09J 2201/122* (2013.01); *C09J 2423/00* (2013.01); *C09J 2483/005* (2013.01); *E04D 2001/005* (2013.01)

(58) Field of Classification Search
CPC ....... E04D 1/22; E04D 1/26; E04D 2001/005; B32B 7/06; B32B 7/12; B32B 27/08; B32B 27/26; B32B 2419/06; C09J 7/0228; C09J 123/26; C09J 2201/122; C09J 2423/00; C09J 2483/005; Y10T 428/14

See application file for complete search history.

(56) References Cited

U.S. PATENT DOCUMENTS

| | | | |
|---|---|---|---|
| 3,239,992 A | * | 3/1966 | Hodgson |
| 4,559,267 A | | 12/1985 | Freshwater et al. |
| 5,027,946 A | | 7/1991 | Parsons |
| 5,932,352 A | * | 8/1999 | Higgins |
| 7,897,666 B1 | | 3/2011 | Berg |
| 8,535,774 B2 | | 9/2013 | Okumura et al. |
| 8,673,152 B2 | | 1/2014 | Shiba et al. |
| 9,140,012 B1 | * | 9/2015 | Leitch et al. |
| 2005/0252141 A1 | | 11/2005 | Kerkar et al. |
| 2010/0041845 A1 | * | 2/2010 | Dershem et al. |
| 2013/0059132 A1 | * | 3/2013 | Aktas ........................ B32B 5/02 428/198 |
| 2016/0046104 A1 | | 2/2016 | Grah |

\* cited by examiner

*Primary Examiner* — Patricia L. Nordmeyer
(74) *Attorney, Agent, or Firm* — Dority & Manning, P.A.

(57) ABSTRACT

A shingle release film product and a roofing shingle product containing such film are described. The shingle release film product comprises a polymer film, a bonding material coating, and a release coating. The release coating comprises a silicone. The bonding material coating comprises an olefin polymer. The film product may be present on a roofing shingle product. The bonding material coating of the film product present on a shingle product is configured to adhere to an adjacent shingle.

19 Claims, 4 Drawing Sheets

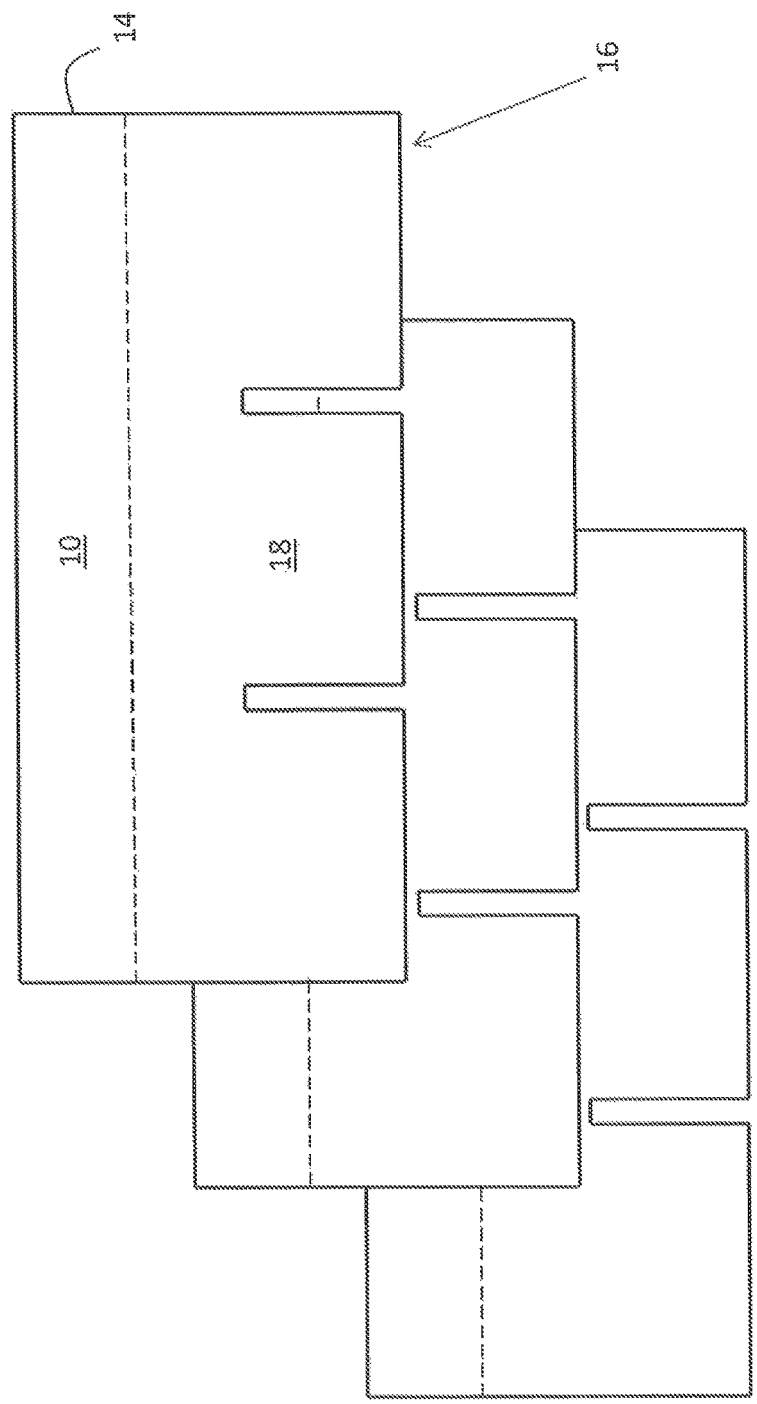

SHINGLE PRODUCT

RELATED APPLICATIONS

The present application is based upon and claims priority to U.S. Provisional Patent Application Ser. No. 62/354,395, filed on Jun. 24, 2016, and which is incorporated herein by reference.

BACKGROUND

Shingles for roofing and siding applications are typically stored in stacks or pallets. These pallets may be exposed to high temperature environments, such as construction sites or storage yards that can receive direct sun for 2 to 12 hours per day. Most conventional shingles contain a layer of adhesive applied to the front surface of each shingle. The adhesive is typically temperature sensitive and will activate when a threshold temperature is reached, such as 20 to 60° F. higher than the expected ambient temperature where the shingles are to be used. When shingles are applied during building construction, solar heat will activate the adhesive and seal the shingles together. However, when pallets of shingles are left in high temperature environments for extended periods of time, solar energy may prematurely activate the adhesive, causing the shingles to adhere to each other.

Previous attempts to remedy this problem have included covering the pallet of shingles with a cardboard or paper wrapper in order to protect the shingles from solar heat. However, these cardboard or paper wrappers often fail to maintain an appropriate ambient temperature within the shingle pallet. Alternately, the pallet can be covered with a heat reflective plastic wrapper or shroud. These plastic wrappers are not only costly and time consuming but can actually increase the internal temperature within the pallet, thus promoting unwanted shingle adhesion.

Other solutions have comprised applying a film to the adhesive coating to prevent sealing of the shingles until just prior to application on a roof. Under certain pallet aging conditions, however, the adhesion of the film can increase so that when the shingle is pulled from the pallet, the film tends to debond from the upper shingle and remain partially or entirely on the adhesive layer of the lower shingle. Alternately, the adhesive strip can debond entirely from both surfaces and become free. These partially or completely debonded films are a nuisance for shingle installers as well as a source of litter at the construction site.

SUMMARY

The present disclosure is generally directed to a polymer film product that may be used as an improved shingle release film. The present disclosure is further directed to a roofing shingle product containing such a polymer film product.

In one embodiment, the present disclosure is directed to a film product that covers a shingle adhesive on a shingle. The film product may comprise a film product having a first side and a second side. A release coating may be applied to the first side of the film product. The release coating may contain a silicone. The film product may further comprise a bonding material coating applied to the second side of the film product. The bonding material coating may comprise an acid modified polyolefin and a cross-linking agent.

In another embodiment, the present disclosure is directed to a roofing shingle product. The shingle product may comprise a shingle, a shingle adhesive, and a film product. The shingle may comprise a petroleum based polymer. The shingle may have a first side and a second side, with a shingle adhesive located on the first side of the shingle. The film product may have a first side and a second side. The film product may further comprise a release coating applied to the first side of the film product and a bonding material coating applied to the second side of the film product. The first side of the film product may cover the shingle adhesive such that the release coating contacts the shingle adhesive. The bonding material coating may be configured to adhere to an adjacent shingle.

In one embodiment, the film product may comprise a polyester film. The polyester film may comprise a biaxially stretched polyester film that has a thickness of from about 0.1 mils to about 15 mils. The bonding material coating may have a thickness of from about 1 nm to about 100 nm.

In one embodiment, the shingle adhesive may comprise a rubber combined with an asphalt.

In one embodiment, the bonding material coating may comprise an olefin polymer, such as an acid modified polyolefin. The acid modified polyolefin may comprise a carboxylic acid or a carboxylic acid anhydride modified polyethylene, polypropylene, or polybutylene polymer. The carboxylic acid or carboxylic acid anhydride modified polyethylene, polypropylene, or polybutylene may be formed from a dicarboxylic acid or a dicarboxylic acid anhydride or a carboxylic acid anhydride. The carboxylic acid anhydride may be an anhydride of maleic acid.

In one embodiment, the bonding material coating may further contain a cross-linking agent. The cross-linking agent may comprise an oxazoline polymer. For example, the cross-linking agent may comprise an oxazoline modified acrylic polymer.

In one embodiment, the roofing shingle product may include a stack of shingles produced in accordance with the present disclosure. The shingles may be stacked so that the first face of each shingle is adjacent the bottom face of its neighboring shingle. The first face of the shingle may contain a film product having a first side and a second side. The first side of the film product may be adjacent the first face of the first shingle while the second side of the film product may contact the bottom face of a neighboring shingle. In a particular embodiment, the film product attached to a first shingle may adhere more strongly to its neighboring shingle. When the second shingle is removed from the stack of shingles, the film may release from the first shingle and may remain bound to the bottom face of the second shingle. The second shingle and attached film may then be used for roofing or siding applications.

In one embodiment, the bonding material coating of the present disclosure may improve the bond between a film product attached to a first shingle and the second face of a neighboring shingle sufficiently to prevent partial or complete debonding of the film from the neighboring shingle when it is pulled from the stack of shingles.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 4 is a view of the front surface of one embodiment of a roofing shingle product made in accordance with the present disclosure.

Figure 1:
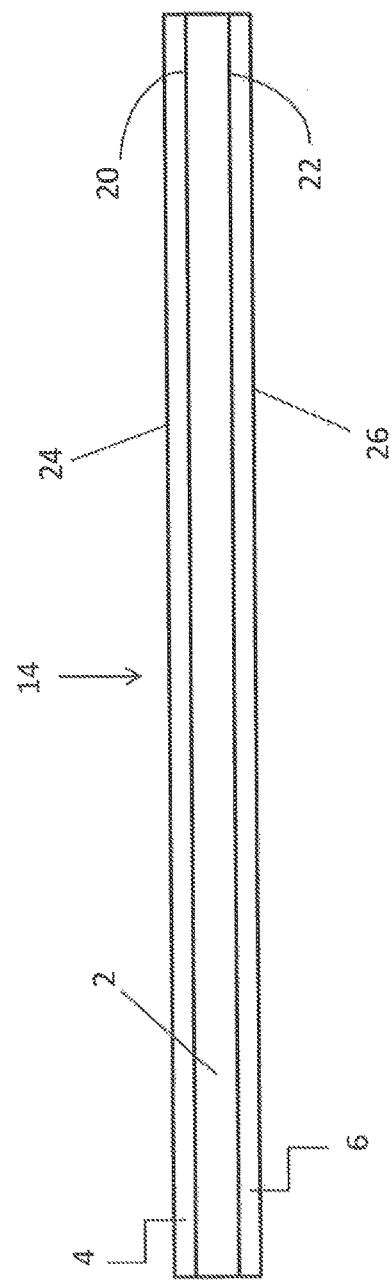
FIG. 1 is a cross-sectional view of one embodiment of a coated polymer film made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a coated polymer film and particularly a coated polyester film that may be used as a shingle release film. The present disclosure is further directed to a roofing shingle product containing a coated polymer film.

Referring to FIG. 1, one embodiment of a coated polymer film made in accordance with the present disclosure is shown. The film product 14 comprises a film 2, bonding material coating 4, and release coating 6.

In one embodiment, film 2 may comprise a polymer film. For example, polymer film 2 can generally comprise any suitable polymer. For instance, polyester films are particularly well suited for use in the present disclosure. The polyester used to construct the film may comprise polyethylene terephthalate, polyethylene naphthalate or polybutylene terephthalate. The polymer film may also comprise copolyesters, such as polyethylene terephthalate isophthalate. Generally, any polyester film based on a polymer resulting from polycondensation of a glycol or diol with a dicarboxylic acid (or its ester equivalent) such as terephthalic acid, isothalic acid, sebacic acid, malonic acid, adipic acid, azelaic acid, glutaric acid, suberic acid, succinic acid, or mixtures thereof. Suitable glycols include ethylene glycol, diethylene glycol, polyethylene glycol, and polyols such as butanediol and the like. Mixtures of two or more of the foregoing are also suitable.

The films may be produced by any known technique in the art. For example, polyester is typically melted and extruded as an amorphous sheet onto a polished revolving casting drum to form a cast sheet of the polymer. The sheet is quickly cooled and then stretched or oriented in one or more directions to impart strength and toughness to the film. For instance, the sheet can be uniaxially stretched or biaxially stretched.

During extrusion, the temperature of the film is generally below about 300° C. For instance, the temperature during extrusion can be from about 275° C. to about 295° C.

Stretching of the film can generally occur as the film is being produced, although stretching can also be conducted offline. Biaxial stretching, for instance, is generally carried out in succession, but can take place simultaneously. When done in succession, stretching typically first takes place longitudinally (in the machine direction) and then transversely (in the transverse direction perpendicular to the machine direction). Stretching the film leads to spatial orientation of the polymer chains. The longitudinal stretching can be carried out with the aid of two rolls rotating at different speeds corresponding to the desired stretching ratio. For the transverse stretching, an appropriate tenter frame can be used in which the film is clamped at the two edges and then drawn towards the two sides at an elevated temperature.

Generally, stretching occurs at a temperature range of from about the second order transition temperature of the polymer to below the temperature at which the polymer softens and melts. In one embodiment, for instance, longitudinal stretching can be carried out at a temperature in the range of from about 80° C. to about 130° C., while the transverse stretching can be carried out at a temperature in the range of from about 90° C. to about 150° C.

The longitudinal stretching ratio can generally be in the range of from about 2:1 to about 6:1, such as from about 2:1 to about 5:1. The transverse stretching ratio is also generally from about 2:1 to about 6:1, such as from about 3:1 to about 5:1.

Where necessary, the film can be further heat treated after stretching to lock-in the properties by further crystallizing the film. The crystallization imparts stability and good tensile properties to the film. Heat treatment, for instance, can generally be conducted at a temperature of from about 150° C. to about 250° C., such as from about 190° C. to about 240° C. Coated films of the present disclosure, for instance, can be exposed to heat at a temperature of from about 210° C. to about 250° C. for a period of from about 1 to about 20 seconds.

The polymer film can generally have a thickness of from about 0.1 mils to about 15 mils, such as from about 0.3 mils to about 10 mils, such as from about 0.5 mils to about 6 mils.

In accordance with the present disclosure, the bonding material coating comprises a coating agent combined with a cross-linking agent. In one embodiment, the coating agent comprises an olefin polymer. The olefin polymer may comprise an acid modified polyolefin. The acid modified polyolefin may comprise a carboxylic acid or a carboxylic acid anhydride modified olefin polymer. For instance, the carboxylic acid or a carboxylic acid anhydride modified olefin copolymer may be ethylene based, butylene based, or propylene based. For instance, the coating agent may comprise a carboxylic acid modified polyethylene, polypropylene, or polybutylene homopolymer or copolymer. The carboxylic acid may include a carboxylic acid or an anhydride of a carboxylic acid. In one embodiment, the carboxylic acid or anhydride has a carbon chain length of from about 1 carbon atom to about 10 carbon atoms. Particular examples of carboxylic acid or carboxylic acid anhydride modified olefin copolymers include ethylene-acrylic acid copolymers, ethylene-methacrylic acid copolymers, butylene-acrylic acid copolymers, and propylene-acrylic acid copolymers.

The carboxylic acid or anhydride may be saturated or unsaturated. In one embodiment, the carboxylic acid or anhydride comprises a dicarboxylic acid or dicarboxylic acid anhydride. For instance, the carboxylic acid may comprise an unsaturated, dicarboxylic acid anhydride, such as an anhydride of maleic acid. For example, in one embodiment, the coating agent comprises a maleated polyethylene dispersion that is combined with the cross-linking agent and applied to the polyester film. In one embodiment, Michem Prime 4983R dispersion obtained from Michelman is used as the coating agent.

In an alternative embodiment, the coating agent may comprise a phenoxy resin.

As described above, the coating agent is combined with a cross-linking agent. The cross-linking agent comprises at least one water-miscible or water-dispersible component which bears reactive groups which can enter into cross-linking reactions, for example polymers with oxazoline groups, carbodiimide groups, epoxy groups, isocyanate groups or melamine. As used herein, the above polymers are referred to as oxazoline polymers, carbodiimide polymers, epoxies, isocyanates, or melamines. Among these, especially polymers with oxazoline are preferred.

Polymers containing oxazoline groups are macromolecular compounds which form through addition polymerization of a) oxazoline derivatives according to the structural formulae (I) to (III) and b) at least one further comonomer.

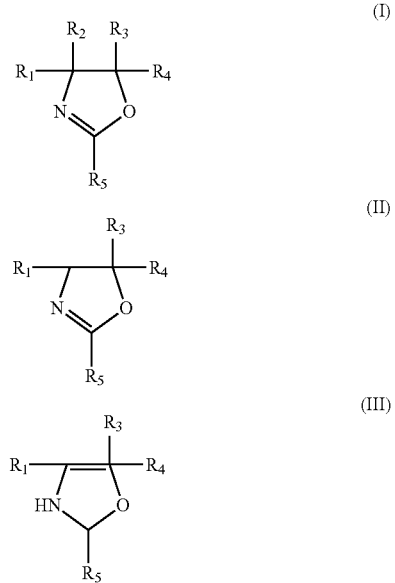

In the structural formulae (I) to (III) depicted above, the R1, R2, R3 and R4 radicals may each independently represent hydrogen atoms, halogen atoms, alkyl groups, aralkyl groups, phenyl groups or substituted phenyl groups. R5 is a noncyclic radical which contains a polymerizable double bond.

Examples of halogen atoms are fluorine, chlorine, bromine and iodine, preference being given to chlorine and bromine. Examples of alkyl groups are methyl, ethyl, n-propyl, isopropyl, n-butyl, isobutyl, pentyl and hexyl groups. Aralkyl groups are understood to mean those radicals which contain alkyl groups with a chain length of 1 to 5 carbon atoms, for example benzyl, phenethyl, benzhydryl and naphthylmethyl groups. Substituted phenyl groups may, for example, be chlorophenyl, bromophenyl, methoxyphenyl, ethoxyphenyl, methylaminophenyl, ethylaminophenyl, dimethylaminophenyl, methylethylaminophenyl and diethylaminophenyl. Examples of noncyclic radicals with polymerizable double bonds are vinyl and isopropenyl groups.

Examples of oxazoline derivatives a) include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. To prepare polymers bearing oxazoline groups, it is possible to use the oxazoline derivatives a) either individually or in a combination of two or more of the compounds mentioned. Among the oxazoline derivatives mentioned, 2-isopropenyl-2-oxazoline is particularly preferred.

The comonomers b) used may in principle be all compounds which are copolymerizable with oxazoline derivatives a). Examples of comonomers b) are methacrylic esters such as methyl methacrylate, butyl methacrylate and 2-ethylhexyl methacrylate, unsaturated carboxylic acids such as methacrylic acid, itaconic acid and malonic acid, unsaturated nitriles such as methacrylonitrile, unsaturated amides such as methacrylamide and N-methylolmethacrylamide, vinyl esters such as vinyl acetate and vinyl propionate, vinyl ethers such as methyl vinyl ether, ethyl vinyl ether, alpha-olefins such as ethene, propene, halogenated alpha,beta-unsaturated compounds such as vinyl chloride, vinylidene chloride and vinyl fluoride, and also alpha,beta-unsaturated aromatic compounds such as styrene and alpha-methylstyrene. The comonomers b) mentioned may be used either individually or in a combination of 2 or more compounds.

The polymer containing oxazoline groups can be prepared, for example, by adding an oxazoline derivative a), at least one comonomer b) and a free-radical initiator, for example benzoyl peroxide or azoisobutyronitrile, to a suitable water-miscible organic solvent and heating the resulting solution. After the polymerization has ended, water can be added and the organic solvent can be removed completely or partially by distillation, which leaves an aqueous polymer dispersion containing oxazoline groups, which is directly suitable for preparation of the inventive coating solution.

Alternatively, it is also possible to polymerize oxazoline derivative(s) a) and comonomer(s) b) anionically, for example with n-butyllithium.

The content of oxazoline groups in the dried polymer is typically 0.5 to 10 mmol/g, preferably 1.5 to 8 mmol/g. The glass transition temperature of the dried polymer is in the range between 0 and 100° C., preferably 20 to 95° C.

Suitable aqueous polymer dispersions containing oxazoline groups are commercially available under the name "EPOCROS®" from Nippon Shokubai (Japan). In this context, water-soluble, solvent-free products of the "EPOCROS® WS" series from the abovementioned manufacturer are particularly suitable for the inventive coating solution.

In addition to the coating agent and the cross-linking agent, the bonding material coating composition may contain various other ingredients. In one embodiment, for instance, the bonding material coating may contain one or more antiblocking agents. For example, the antiblocking agent may comprise inorganic and/or organic particles. Particular examples of antiblocking agents include silicone dioxide, calcium carbonate, and aluminum oxide. In another embodiment, for instance, the coating may contain antifoaming or defoaming agents.

The relative amounts of the components in the bonding material coating can vary depending upon various factors. In one embodiment, for instance, the dried coating can contain the coating agent and cross-linking agent in a weight ratio of from about 3:7 to about 20:1, such as from about 2:3 to about 4:1, such as from about 2:3 to about 3:2. In various embodiments, the weight ratio of the coating agent to the cross-linking agent can be from about 1:1 to about 20:1, such as from about 1:1 to about 9:1, such as from about 6:4 to about 9:1, such as from about 6:4 to about 8:2, such as from about 7:3 to about 9:1, such as from about 7:3 to about 8.5:1. In one particular embodiment, the coating agent and cross-linking agent are present in the coating at a weight ratio of from about 1:2 to about 5:1, such as from about 2:1 to about 4:1. In another embodiment, the coating agent and cross-linking agent are present in the coating at a weight ratio of from about 1.2:1 to about 1:1.2. In one embodiment, the coating agent is present in an amount greater than the cross-linking agent, based on weight.

In one embodiment, coating agent may comprise an ethylene based polymer. The dried coating can contain the coating agent and the cross-linking agent in a weight ratio from about 2:1 to about 1:2, such as from about 1.5:1 to about 1:1.5, such as from about 1.25:1 to about 1:1.25. In one particular embodiment, the dried coating can contain about 40% to about 65% by weight of an ethylene polymer, such as an ethylene acrylic acid copolymer dispersion, and from about 35% to about 60% of an oxazoline modified acrylic polymer. The dried coating may be applied such that the coating laydown is about 0.02 g/m². The dried coating may have a thickness of about 20 nm.

In one embodiment, coating agent may comprise a polypropylene based polymer. The dried coating can contain the coating agent and the cross-linking agent in a weight ratio from about 4:1, such as from about 8:1 to about 1:1, such as from about 6:1 to about 2:1, such as from about 5:1 to about 3:1. In one particular embodiment, the dried coating can contain about 60% to about 85% by weight of a polypropylene based polymer, such as Michem EIF-1312 obtained from Michelman, from about 7% to about 37% by weight of an oxazoline modified acrylic, such as Shobukai Epocross WS700 obtained from Nippon, and from about 3% to about 8% of a napthenic oil/silica-based antifoam. The dried coating may be applied such that the coating laydown is about 0.10 g/m². The dried coating may have a thickness of about 100 nm.

In accordance with the present disclosure, the film product 14 shown in FIG. 1 further comprises a release coating 6. In one embodiment, the release coating may comprise a silicone. The silicone coating can be, for instance, a solvent cross-linkable type silicone coating, a solvent-free silicone coating, a solvent-free ultraviolet or electron beam curable silicone coating, or an aqueous based silicone coating. In one embodiment, the silicone coating comprises a thermal cured silicone coating that may be platinum catalyzed and may be formed from a silicone emulsion.

In one embodiment the release coating may comprise a siloxane polymer or blends thereof. The siloxane polymer may comprise a high molecular weight diorganopolysiloxane. The diorganopolysiloxane may have a viscosity of greater than 50 Pa·s. The diorganoploysiloxane may have an average molecular weight (Mw) of at least about 60,000 atomic mass units (amu), and more preferably between about 75,000 amu to about 2,000,000 amu. In addition, the siloxane polymer can have a number of side chains attached to the main polymeric chain. The groups or radicals that can form these side chains on the siloxane backbone can include, for example, C1-C60 alkyl groups, aromatic rings, hydrogen, hydroxyl groups, vinyl groups and phenyl groups, among others.

In one embodiment, the siloxane polymer molecule used to form the additive may be selected to be a large molecule. The size of the siloxane polymer may aid in fixing the additive to the thermoplastic film component, thereby helping to prevent the migration of the siloxane polymer. In particular, the large siloxane polymer molecule may be able to physically wrap around and become entangled with the polymeric film component.

In one embodiment, the release coating may comprise a silicone in combination with a binding agent. For example, the binding agent may be any material capable of forming hydrogen bonds with the silicone. In a particular embodiment, the binding agent can form covalent bonds with the siloxane polymer under certain circumstances, further enhancing the bonding between the siloxane polymer and the binding agent.

The binding component may take various forms, including a solid particle mentioned above, e.g., silica, a suitable resin material, such as a siloxane based MQ resin, a metal hydroxyl-containing molecule, or an inorganic or organic acid having multiple hydroxyl groups thereon, such as boric acid or phosphoric acid, among others. In one particular embodiment, the binding component possesses surface hydroxyl functional groups to induce hydrogen bonding with any side chain groups disposed on the backbone of the silicone component. In another embodiment, the binding agent is selected from group consisting of an inorganic or organic acid having multiple hydroxyl groups thereon which is not boric acid, such as phosphoric acid, MQ siloxane resin and fumed silica.

In one embodiment, process or treating aids may be used to improve mixing and processing of the silicone and binding components. One example of such a process aid is a short chain di-hydroxy endblocked polydimethyl siloxane. Yet another process aid that can be added to the mixture of the components is a silane. Other process aids may be shorter chain diorganopolysiloxanes containing dimethyl, methyl phenyl and methyl vinyl siloxane segments. In one embodiment, these process aids may be used to assist in the formation of the release coating of the present invention but do not directly affect the final film produced.

Any of the above film product components, including the polymer film, bonding material coating, and release coating, can contain conventional additives such as antioxidants, delusterants, pigments, fillers such as silica, calcium carbonate, kaolin, titanium dioxide, antistatic agents and the like or mixtures thereof. In one embodiment, for instance, a filler may be present in one or more film components sufficient to colorize and increase the opacity of the film or components thereof. In one embodiment, for instance, the film components can include a filler to make the film or components thereof have a white appearance. One filler that may be used, for instance, is barium sulfate. Barium sulfate may be present in one or more of the components in an amount from about 5% to about 30% by weight, such as from about 15% to about 25% by weight. In an alternative embodiment, the filler may comprise titanium dioxide. Titanium dioxide may be present in one or more of the components in order to form a weatherable skin layer on a polymeric article. The titanium dioxide may be present in one or more of the components in an amount from about 5% to about 20% by weight, such as in an amount from about 10% to about 15% by weight.

For a further increase in the whiteness, suitable optical brighteners can optionally be added to the pigmented compositions (in a multilayer structure preferably to the pigmented layers). Suitable optical brighteners are, for example, 2-[4-[4-(2-Benzoxazolyl)styryl]phenyl]-5-methylbenzoxazole; 4-(2-Benzoxazolyl)-4'-(5-methyl-2-benzoxazolyl)stilbene, commercially sold as HOSTALUX® KS (from Clariant, Germany), or 2,2'-(4.4'-diphenol vinyl)dihenzoxazol; 2,2'-(1,2-Ethenediyldi-4,1-phenylene)bisbenzoxazole, commercially sold as EASTOBRIGHT® OB-1 (from Eastman, USA).

In an alternative embodiment, one or more of the components may contain no colored fillers. Consequently, the film components made from the compositions can be translucent or transparent. In one particular embodiment, for instance, the film product may be clear and transparent.

The film components may comprise further particles as antiblocking agents in one or more layers. Typical antiblocking agents are inorganic and/or organic particles, for example silicon dioxide (precipitated or fumed), calcium carbonate, magnesium carbonate, barium carbonate, calcium sulfate, lithium phosphate, calcium phosphate, magnesium phosphate, kaolin (hydrated or calcined), aluminum oxide, aluminum silicates, lithium fluoride, calcium salts, barium salts, zinc salts or manganese salts of the dicarboxylic acids used, or cross-linked polymer particles, for example polystyrene or polymethyl methacrylate particles.

In addition, it is also possible to select mixtures of two or more particle systems or mixtures of particle systems with the same chemical composition but different particle size as antiblocking agent.

When particles are present as antiblocking agents in one or more of the film components, the total concentration of these particles is less than 20% by weight, based on the total weight of the modified layer, preferably less than 15% by weight and more preferably less than 5% by weight. The particles have a mean size of 0.01 to 15 µm, preferably 0.03 to 10 µm and more preferably 0.05 to 5 µm.

The film components may comprise further additives such as UV stabilizers, flame retardants, hydrolysis stabilizers and antioxidants.

UV stabilizers, i.e. UV absorbers as light stabilizers, are chemical compounds which can intervene in the physical and chemical processes of light-induced polymer degradation. Suitable UV stabilizers are, for example, 2-hydroxybenzophenones, 2-hydroxybenzotriazoles, organonickel compounds, salicylic esters, cinnamic ester derivatives, resorcinol monobenzoates, oxanilides, hydroxybenzoic esters, benzoxazinones, sterically hindered amines and triazines, preference being given to the 2-hydroxybenzotriazoles, the benzoxazinones and the triazines. In one embodiment, the inventive film comprises, as a UV stabilizer, 0.1 to 5.0% by weight of 2-(4,6-diphenyl[1,3,5]triazin-2-yl)-5-hexyloxyphenol of the formula

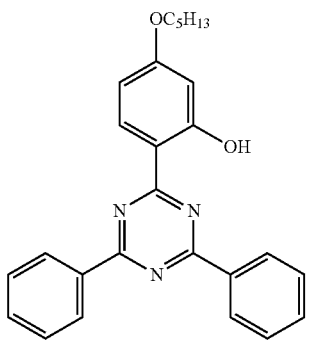

or 0.1 to 5.0% by weight of 2,2'-methylenebis[6-benzotriazol-2-yl]-4-(1,1,2,2-tetramethylpropyl)phenol of the formula

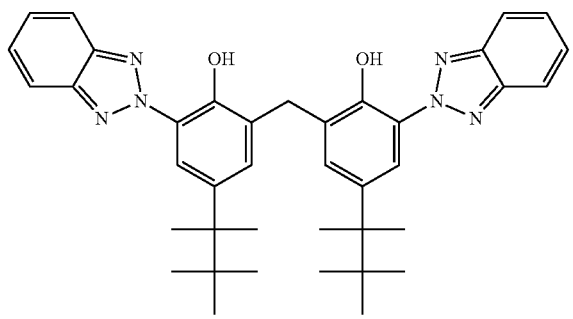 [SMILES: CC(C)(C)C(C)(C)c1cc(Cc2cc(C(C)(C)C(C)(C)C)cc(-n3nc4ccccc4n3)c2O)c(O)c(-n2nc3ccccc3n2)c1]

or 0.1 to 5.0% by weight of 2,2'-(1,4-phenylene)bis([3,1]-benzoxazin-4-one) of the formula

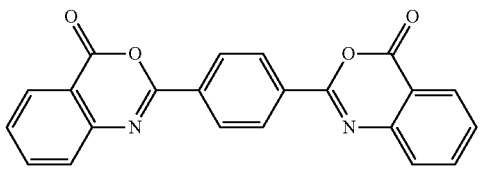 [SMILES: O=c1oc(-c2ccc(-c3nc4ccccc4c(=O)o3)cc2)nc2ccccc12]

In a further embodiment, it is also possible to use mixtures of these UV stabilizers or mixtures of at least one of these UV stabilizers with other UV stabilizers, where the total concentration of light stabilizers is preferably between 0.1 and 5.0% by weight, more preferably in the range from 0.5 to 3.0% by weight, based on the weight of the film.

In accordance with the present disclosure, in one embodiment, shown in FIG. 1, the polymer film 2 may have a first side 22 and a second side 20. The release coating 6 may be present on the first side 22 of the polymer film 2. The bonding material coating 4 may be present on the second side 20 of the polymer film 2.

The bonding material coating and release coating may be applied to the polymer film via any suitable technique or method. In the present disclosure, the term "coating composition" may refer to the release coating or the bonding material coating as described in the present disclosure. In one embodiment, the components of the coating composition(s) are contained in an aqueous composition and applied to the polymer film. The coating composition(s), for instance, can have about 0.5% to about 30% solids, such as from about 1% to about 10% solids.

In one embodiment, the surface of the polymer film may be subject to pretreatments, such as corona treatment, plasma treatment, ozone treatment, chemical treatment, solvent treatment, and the like prior to application of the coating composition(s).

In one embodiment, the coating composition(s) may be applied to the film in-line, such as while the film is being produced and before the film has been completely stretched or heat set. In one embodiment, the coating composition(s) may be applied while the film is being biaxially stretched. In one particular embodiment, for instance, the coating composition(s) can be applied to the film in-line by means of an aqueous dispersion after the longitudinal stretching step but prior to the transverse stretching step. If desired, prior to the application of the coating composition(s), the surface of the film may be subjected to a corona treatment. For example, in one embodiment, the coating composition(s) can be applied to the polymer film after corona treatment and prior to stretch orientation In addition to in-line coating, the coating composition(s) can also be applied to the film off-line. Thus, in one embodiment, the coating composition(s) can be applied to the film after the film has been produced and cooled. When coating both sides of the film, for instance, one side of the film can be coated in-line, while the other side of the film can be coated off-line. Alternately, both sides of the film can be coated in-line, or both sides of the film can be coated off-line.

In one embodiment, the coating composition(s) can be formed on the film using any method known in the art, including but not limited to gravure roll coating, reverse roll coating, wire bar coating, lip coating, air knife coating, curtain flow coating, spray coating, dip coating, immersion coating, brush coating, and the like.

In one particular embodiment, the coating composition(s) is printed onto a side of the polymer film. Printing the coating composition(s) onto the film can provide numerous advantages. For instance, printing can control the amount applied and/or the area that is covered. In one embodiment, the coating composition(s) is printed onto the film using gravure printing.

In one embodiment, the coating composition(s) may be uniformly or non-uniformly applied to the surface of the film. For example, in one embodiment, the bonding material coating or the release coating may be applied such that it forms a uniform layer on one side of the polymer film. Alternatively, the coating composition(s) may be applied such that it forms a non-uniform layer on one or more sides of the polymer film in a pattern of treated areas and untreated areas.

In one embodiment, one or more of the dried coatings on the polyester film can generally have a thickness from about 1 nm to about 500 nm. For instance, the dried coating can have a thickness from about 5 nm to about 100 nm, such as from about 10 nm to about 60 nm.

In one embodiment, the film product can typically have a thickness of greater than about 0.1 mils, such as greater than about 0.5 mils, such as greater than about 1 mils, such as greater than about 2 mils. The film product may have a thickness of less than about 15 mils, such as less than about 12 mils, such as less than about 10 mils, such as less than about 8 mils, such as less than about 5 mils.

The present disclosure is further directed to a roofing shingle product containing the film product described above. As used herein, "shingles" includes any granule-covered roofing membranes, whether in the form of individual shingle pieces, or in the form of a rolled granule-covered roofing sheet. In one embodiment, the shingle of the present disclosure may be a strip shingle or a laminated shingle, otherwise known as a dimensional or architectural shingle.

Figure 2:
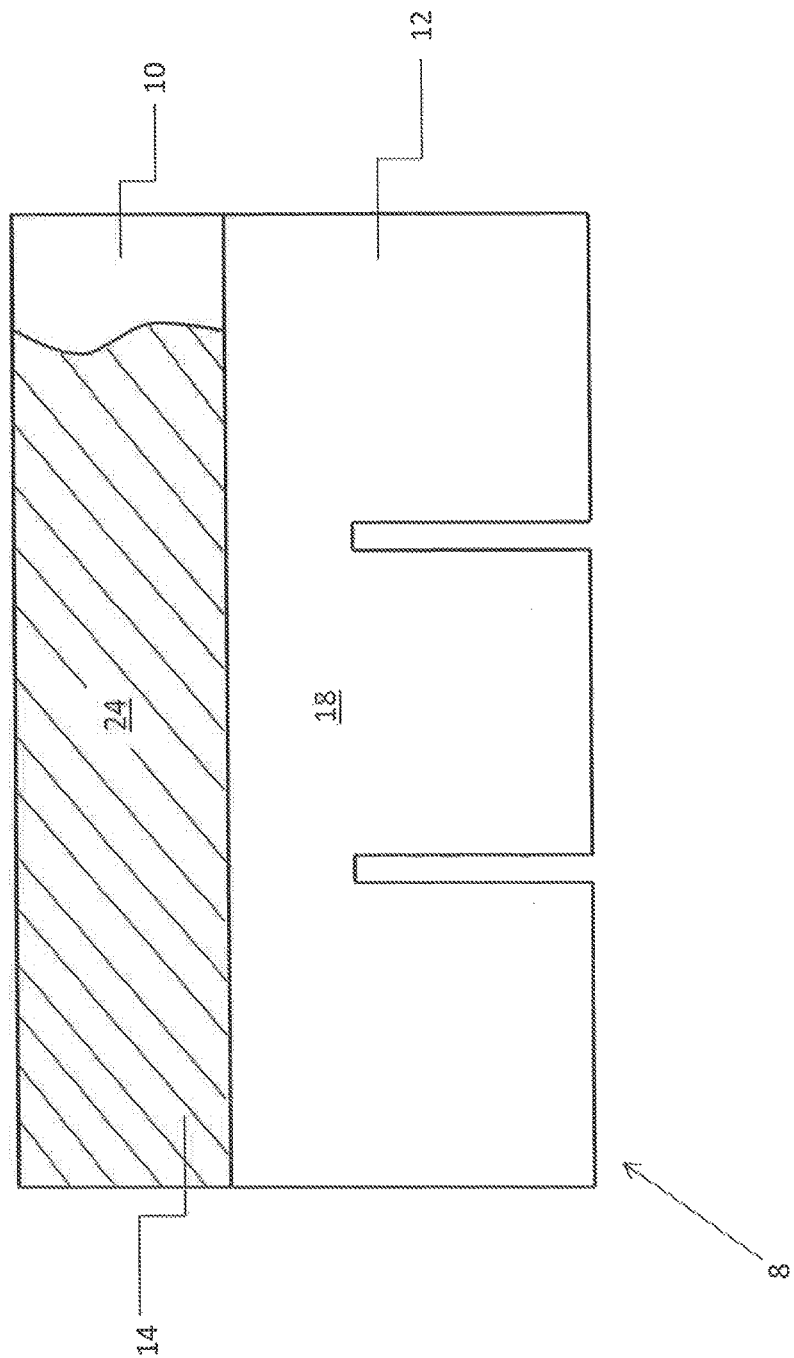
FIG. 2 is a view of a front surface of one embodiment of a shingle made in accordance with the present disclosure.

Referring to FIG. 2, one embodiment of a shingle roof product made in accordance with the present disclosure is shown. Shingle roof product 8 comprises a shingle 12, a shingle adhesive 10 and a film product 14 as described above.

According to the present disclosure, the shingle may comprise a petroleum based polymer. In one embodiment, the shingle may be composed of asphalt, tar, and/or rubber. In one particular embodiment, the shingle comprise a rubber. For example, the shingle may comprise styrene-butadiene (SBR), acrylonitrile-butadiene (NBR), chloroprene rubber (CR), butadiene rubber (BR), isoprene rubber (IR), butyl rubber (IIR), ethylene-propylene rubber (EPR), ethylene-propylene diene monomer (EPDM), polyisobutylene (PIB), chlorinated polyethylene (CPE), natural rubber or mixtures thereof.

In one embodiment of the present disclosure, the shingle may further comprise a reinforcing fiber. For example, in one embodiment, the shingle may comprise glass fibers.

In accordance with the present disclosure, the shingle may be prepared following conventional procedures. For example, petroleum polymer based prepared roofing has heretofore been extensively manufactured using as a base a fibrous web such as a sheet of roofing felt, impregnating the web with a petroleum polymer material and coating one or both surfaces of the impregnated web with a weather-resistant petroleum polymer coating material. The petroleum polymer based roofing may also be prepared using as a base a glass fiber reinforcing mat. The mat may be produced from wet, random-laid fiberglass bonded with urea-formaldehyde resin. One or both surfaces of the fiberglass mat may then be coated with a petroleum polymer coating material. The bituminous coating material usually contains a mineral filler such as slate flour or powdered limestone. Usually there is applied to the petroleum polymer coating on the surface intended to be exposed to the weather a suitable granular material such as slate granules or mineral surfacing. Finely divided materials such as mica flakes, talc, silica dust or the like may be made adherent to the non-weather exposed surface of the roofing shingle to prevent sticking of the adjacent layers of the roofing material in the package. Additives may be added to the petroleum polymer mixture to improve certain properties of the shingle, including copper to prevent algal growth, styrene-butadiene-styrene (SBS) to increase resistance to thermal cracking, and colored granules for production of colored shingles.

In one embodiment of the present invention, the shingle adhesive may comprise a rubber in combination with an asphalt. For example, in one embodiment, shingle adhesive may comprise a rubber that is the same or different from the rubber comprising the shingle. The asphalt may be chosen from any substance known in the art as "asphalt", including but not limited to petroleum based asphalt and bioasphalt. The shingle adhesive may be applied to the shingle by any manner known in the art.

As illustrated in FIG. 2, in one embodiment of the present disclosure, the shingle 12 has a first face 18 and a second face (not shown). The film product 14 is shown in a partial cut-away to illustrate the underlying shingle adhesive 10, which is present on the first face 18 of the shingle 12. The first side (not shown) of the film product 14 may cover the shingle adhesive 10 such that the release coating contacts the shingle adhesive. The second side 24 of the film product 14 may face away from the first face 18 of the shingle 12. The film product 14 may completely or partially cover the shingle adhesive 10. The film product 14 may also extend beyond the area of the shingle adhesive 10; thus in one embodiment the film product 14 may cover all or a part of the shingle face 18 that does not contain shingle adhesive 10.

In one embodiment of the present disclosure, the roofing shingle product may comprise a stack of one or more shingles. The shingles may be stacked in any known orientation. The shingle products of the present embodiment may have a first face and a second face. In one embodiment, the shingle products may be stacked in an alternating front face to front face or a back face or back face configuration. Alternately, the shingle products may be stacked one atop another such that the first face of a first shingle faces the second face of a second shingle.

Figure 3:
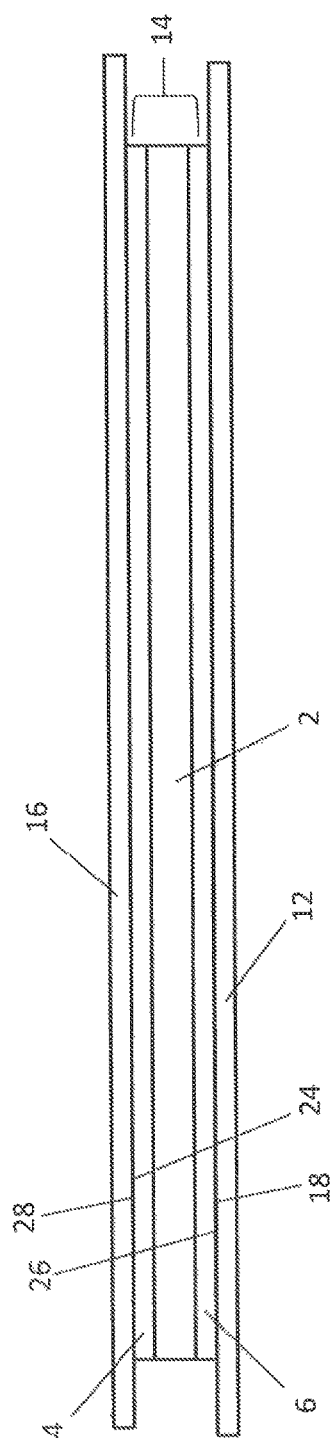
FIG. 3 is a cross-sectional view of one embodiment of a roofing shingle product made in accordance with the present disclosure.

In one particular embodiment of the present disclosure, for example, as illustrated in FIG. 3, a second shingle 16 may be located above a first shingle 12. The first shingle 12 may be separated from a second shingle 16 by the film product 14. The first side 26 of the film product 14 may contact the first face 18 of a first shingle 12. A second side 24 of the film product 14 may contact a second face 28 of a second shingle 16.

In one embodiment, the bonding material coating may be configured to adhere to an adjacent shingle. For example, as shown in FIG. 3, the second side 24 of the film product 14 may comprise the bonding material coating 4. The bonding material coating 4 may adhere to the second face 28 of a second shingle 16. In one embodiment, the components of the bonding coating material may be chosen such that the bonding coating material has the capacity to adhere to the petroleum polymer based composition of the shingle 16. In one embodiment, the bonding material coating 4 may adhere to the second shingle 16 such that when the second shingle 16 is removed from a stack of shingles, the adherence of the bonding material coating 4 to the second shingle 16 may be greater than the adherence of the release coating 6 to the first shingle 12. Therefore, in one embodiment, when the second shingle 16 is removed from a stack of shingles, the film product 14 may remain partially or completely attached to the second face 28 of the second shingle 16 while detaching from the first face 26 of the first shingle 12. Thus, in one embodiment, when the second shingle 16 is removed from a stack of shingles, the film product 14 may also be removed from the stack of shingles.

In a further embodiment, the film product may remain attached to a second shingle during application of the second shingle 16 to a roof. For example, in one embodiment of the present disclosure, illustrated in FIG. 4, the film product 14 may be integrated into a roofing or siding structure. In the roofing or siding structure, a front face 18 of a shingle 16 may face the ambient environment while a back face (not shown) of a shingle 16 may face a base component such as a roofing or siding structure or another shingle. In the embodiment illustrated in FIG. 4, the film product 14 is present on the back face (not shown) of the shingle and is therefore underneath the shingle 12. For example, the film product 14 may be completely or partially adhered to the back face (not shown) of a shingle 16. As illustrated in the front-facing embodiment shown in FIG. 4, the film product 14 may be hidden from the sight of a front-facing observer by the shingle 16. In one embodiment of the present invention, the attached film product does not adversely affect roofing shingle performance in protecting roofs, nor does it adversely affect aesthetic appeal of the roofing shingle. In fact, the film product may actually improve the performance of the shingle in at least one respect.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A roofing shingle product comprising:
    a shingle having a first side and a second side;
    a shingle adhesive located on the first side of the shingle; and
    a polymer film product having a first side and a second side, a release coating applied to the first side of the polymer film product and a bonding material coating applied to the second side of the polymer film product, the first side of the polymer film product covering the shingle adhesive such that the release coating contacts the shingle adhesive, the bonding material coating comprising an olefin polymer and being configured to adhere to an adjacent shingle.

2. A roofing shingle product as defined in claim 1, wherein the shingle comprises at least one petroleum based polymer.

3. A roofing shingle product as defined in claim 2, wherein the shingle comprises styrene-butadiene (SBR), acrylonitrile-butadiene (NBR), chloroprene rubber (CR), butadiene rubber (BR), isoprene rubber (IR), butyl rubber (IIR), ethylene-propylene rubber (EPR), ethylene-propylene diene monomer (EPDM), polyisobutylene (PIB), chlorinated polyethylene (CPE), natural rubber or mixtures thereof.

4. A roofing shingle product as defined in claim 1, wherein the shingle further comprises a reinforcing fiber.

5. A roofing shingle product as defined in claim 4, wherein the reinforcing fiber comprises glass fibers.

6. A roofing shingle product as defined in claim 1, wherein the olefin polymer contained in the bonding material coating comprises an acid modified polyolefin, the bonding material coating further containing a cross-linking agent.

7. A roofing shingle product as defined in claim 6, wherein the acid modified polyolefin comprises a carboxylic acid or a carboxylic acid anhydride modified polyethylene, polypropylene, or polybutylene polymer.

8. A roofing shingle product as defined in claim 7, wherein the carboxylic acid or carboxylic acid anhydride modified polyethylene, polypropylene, or polybutylene is formed from a dicarboxylic acid or a dicarboxylic acid anhydride.

9. A roofing shingle product as defined in claim 7, wherein the carboxylic acid or carboxylic acid anhydride modified polyethylene, polypropylene, or polybutylene comprises a carboxylic acid anhydride.

10. A roofing shingle product as defined in claim 9, wherein the carboxylic acid anhydride comprises an anhydride of maleic acid.

11. A roofing shingle product as defined in claim 6, wherein the cross-linking agent contained in the coating comprises an oxazoline polymer.

12. A roofing shingle product as defined in claim 6, wherein the cross-linking agent comprises an oxazoline modified acrylic polymer.

13. A roofing shingle product as defined in claim 1, wherein the shingle adhesive comprises a rubber combined with an asphalt.

14. A roofing shingle product as defined in claim 1, wherein the release coating on the polymer film product comprises a silicone.

15. A roofing shingle product as defined in claim 1, wherein the polymer film product comprises a polyester film.

16. A roofing shingle product as defined in claim 15, wherein the polymer film comprises a biaxially stretched polyester film that has a thickness of from about 0.1 mils to about 15 mils.

17. A roofing shingle product as defined in claim 1, wherein the bonding material coating has a thickness of from about 1 nm to about 100 nm.

18. A roofing shingle product as defined in claim 1, wherein the roofing shingle product includes a stack of at least two shingles wherein the second side of the polymer film product contacts the second side of an adjacent shingle.

19. A film product for covering a shingle adhesive on a shingle comprising:
    a polymer film product having a first side and a second side, a release coating applied to the first side of the polymer film product, the release coating containing a silicone, the polymer film product further including a bonding material coating applied to the second side of the polymer film product, the bonding material coating comprising an acid modified polyolefin and a cross-linking agent.

* * * * *